United States Patent
Takeda

(10) Patent No.: US 10,634,272 B2
(45) Date of Patent: Apr. 28, 2020

(54) SWIVEL JOINT

(71) Applicant: TADANO LTD., Kagawa (JP)

(72) Inventor: Seiji Takeda, Kagawa (JP)

(73) Assignee: TADANO LTD., Kagawa (JP)

(*) Notice: Subject to any disclaimer, the term of this patent is extended or adjusted under 35 U.S.C. 154(b) by 203 days.

(21) Appl. No.: 15/561,105

(22) PCT Filed: Jan. 21, 2016

(86) PCT No.: PCT/JP2016/000301
§ 371 (c)(1),
(2) Date: Sep. 25, 2017

(87) PCT Pub. No.: WO2016/151984
PCT Pub. Date: Sep. 29, 2016

(65) Prior Publication Data
US 2018/0119863 A1 May 3, 2018

(30) Foreign Application Priority Data

Mar. 26, 2015 (JP) .................................. 2015-063992

(51) Int. Cl.
*F16L 39/06* (2006.01)
*F16L 27/08* (2006.01)
*E02F 9/12* (2006.01)
*E02F 9/00* (2006.01)

(52) U.S. Cl.
CPC ............... *F16L 39/06* (2013.01); *E02F 9/00* (2013.01); *E02F 9/12* (2013.01); *F16L 27/08* (2013.01)

(58) Field of Classification Search
CPC ..... F16L 39/06; F16L 27/08; E02F 9/00; E02F 9/12
USPC .................................. 285/98, 272, 275, 282
See application file for complete search history.

(56) References Cited

U.S. PATENT DOCUMENTS

| 4,405,162 A * | 9/1983 | Williams ................ F16L 39/06 285/121.6 |
| 2002/0043800 A1 * | 4/2002 | Montgomery .......... F16L 39/04 285/95 |

FOREIGN PATENT DOCUMENTS

JP 07-038884 U 7/1995

* cited by examiner

*Primary Examiner* — Anna M Momper
*Assistant Examiner* — Fannie C Kee
(74) *Attorney, Agent, or Firm* — Paratus Law Group, PLLC

(57) ABSTRACT

A swivel joint for supplying and discharging various types of fluid between the top and bottom of a rotating platform includes an outer cylinder, an intermediate cylinder, and an inner cylinder that are arranged concentrically around a central axis. The intermediate cylinder can freely rotate with respect to the outer cylinder and the inner cylinder, and a hydraulic fluid flow channel is provided between the outer cylinder and the intermediate cylinder. A hot water flow channel between the lower portion of the inner cylinder and the intermediate cylinder includes an inner annular groove formed on the inner circumferential face of the intermediate cylinder. An air flow channel between the upper portion of the inner cylinder and the intermediate cylinder includes outer annular grooves formed on the outer surface of the inner cylinder.

3 Claims, 8 Drawing Sheets

SWIVEL JOINT

CROSS REFERENCE TO PRIOR APPLICATION

This application is a National Stage Patent Application of PCT International Patent Application No. PCT/JP2016/000301 (filed on Jan. 21, 2016) under 35 U.S.C. § 371, which claims priority to Japanese Patent Application No. 2015-063992 (filed on Mar. 26, 2015), which are all hereby incorporated by reference in their entirety.

TECHNICAL FIELD

The present invention relates to a swivel joint. In more detail, the present invention relates to a swivel joint to be used in a working vehicle in which a slewing base is mounted on a traveling vehicle such as a truck crane or a vehicle for working at height.

BACKGROUND ART

In a working vehicle on which a slewing base is mounted, it is necessary to supply a working medium such as hydraulic oil, air, or hot water from a hydraulic power source, an air pressure source, or a hot water source disposed on the traveling vehicle, to each of a hydraulic device, a pneumatic device, and a heating device mounted on the slewing base. Such a working medium is adapted to be supplied to each device via a swivel joint because the slewing base slews on the vehicle frame.

A swivel joint of Patent Literature (hereinafter, abbreviated as PTL) 1 is for different kinds of fluid for supplying and discharging hydraulic oil, hot water, and air. As illustrated in FIG. 8, the swivel joint has a structure in which inner cylinder 121, intermediate cylinder 131, and outer cylinder 141 are fitted concentrically.

Upper portions of about ⅔ from the top in the height direction of outer cylinder 141 and intermediate cylinder 131 are allocated for a hydraulic oil passage. The hydraulic oil passage is mainly configured of a plurality of inner annular grooves 148 formed on the inner circumferential face of outer cylinder 141, and a plurality of intermediate cylinder side passages 132 perforated vertically in the wall body of intermediate cylinder 131.

Lower portions of about ⅓ from the bottom in the height direction of outer cylinder 141 and intermediate cylinder 131 are allocated for a hot water passage. The hot water passage is mainly configured of inner annular grooves 149 formed on the inner circumferential face of outer cylinder 141, and a plurality of intermediate cylinder side passages 133 perforated vertically in the wall body of intermediate cylinder 131.

A lower portion of intermediate cylinder 131 and inner cylinder 121 are allocated for an air passage. The air passage is mainly configured of a plurality of outer annular grooves 129 formed on the outer circumferential face of inner cylinder 121, and a plurality of intermediate side passages 134 perforated axially in the wall body of intermediate cylinder 131.

Adjacent to respective annular grooves 148, 149, and 129 in the upper and lower direction, annular packings 146, 147, and 127 are fitted.

In the aforementioned conventional technology, it is characterized that annular grooves are not processed on the inner circumferential face and the outer circumferential face of intermediate cylinder 131. This makes processing of intermediate cylinder 131 easy.

Further, the hot water passage portion located at about ⅓ from the bottom of intermediate cylinder 131 and outer cylinder 141 have smaller outer diameters compared with that of the hydraulic oil passage portion located above it, thereby improving the assemble property when intermediate cylinder 131 is assembled into outer cylinder 141.

However, the aforementioned conventional technology involves the following problem:

(1) While hot water is supplied to and discharged from inner annular grooves 149 of the hot water passage of outer cylinder 141, as the lubricating property of water is low, intermediate cylinder 131 is worn quickly, whereby the frequency of replacement of intermediate cylinder 131 increases. As intermediate cylinder 131 is a large member having a height dimension of about the same as that of outer cylinder 141, and is a member which is difficult to be processed and in which a plurality of passages must be perforated in the wall body, there is a problem that the replacement cost for intermediate cylinder 131 is high and the replacement work takes labor.

CITATION LIST

Patent Literature

PTL 1
Japanese Utility Model (Registration) Application Laid-Open No. 7-38884

SUMMARY OF INVENTION

Technical Problem

In view of the situation described above, an object of the present invention is to provide a swivel joint enabling the replacement cost at the time of wear to be lowered.

Solution to Problem

A swivel joint of a first aspect of the present invention is a swivel joint for supplying and discharging a plurality of types of fluid above and below a slewing base, the swivel joint including an outer cylinder, an intermediate cylinder, and an inner cylinder that are fitted concentrically around a center axis extending vertically, in which the outer cylinder and the inner cylinder are unturnably fixed, and the intermediate cylinder is turnable relative to the outer cylinder and the inner cylinder, a hydraulic oil passage is provided between the outer cylinder and the intermediate cylinder, the hydraulic oil passage including a plurality of inner annular grooves formed on an inner circumferential face of the outer cylinder, a hot water passage is provided between a lower portion of the inner cylinder and the intermediate cylinder, the hot water passage including an inner annular groove formed on an inner circumferential face of the intermediate cylinder, and an additional different fluid passage is provided between an upper portion of the inner cylinder and the intermediate cylinder, the additional different fluid passage includes an outer annular groove formed on an outer surface of the inner cylinder.

In the swivel joint of a second aspect of the present invention, in the first aspect, the inner cylinder has a level difference formed on an outer circumferential face in middle in a vertical direction of the inner cylinder, the intermediate cylinder has a level difference formed on the inner circumferential face in middle in a vertical direction of the intermediate cylinder, the inner annular groove constituting the hot water passage and an annular packing are provided on an inner circumferential face of an intermediate cylinder large diameter portion below the level difference in the intermediate cylinder facing an inner cylinder large diameter portion below the level difference in the inner cylinder, and the outer annular groove constituting the additional different fluid passage and an annular packing are provided on an outer circumferential face of an inner cylinder small diameter portion above the level difference in the inner cylinder facing an intermediate cylinder small diameter portion above the level difference in the intermediate cylinder.

In the swivel joint of a third aspect of the present invention, in the first or the second aspect, a plurality of the inner annular grooves of the hot water passage and a plurality of the outer annular grooves for the additional different fluid are formed.

Advantageous Effects of Invention

According to the first aspect, as lubricating property of hot water is low, a counter sliding surface of the inner annular groove of the hot water passage is easily worn. However, in the case of replacement due to wear, it is only necessary to replace the inner cylinder that is a smallest member. Therefore, the replacement cost is suppressed. Further, the outer annular groove of the additional different fluid passage located in an upper portion of the inner cylinder can be made by processing the outer face of the inner cylinder. Therefore, processing is easy, productivity can be improved, and also the processing accuracy is improved. Thereby, an inconvenience such as fluid leakage is less likely to be caused.

According to the second aspect, there is a level difference in the middle of the vertical direction of the inner cylinder and the intermediate cylinder. Accordingly, when the inner cylinder is assembled into the intermediate cylinder, assembling can be made without causing the packing inner face of the hot water passage to be in contact with the packing outer face of the additional different fluid passage. Therefore, the inserting work becomes easily, and damage on the packing is less likely to be caused.

According to the third aspect, as there are a plurality of inner annular grooves of the hot water passage and outer annular grooves of the additional different fluid passage, it is possible to supply and discharge hot water and the air in several systems at a time.

DESCRIPTION OF EMBODIMENTS

Next, an embodiment of the present invention will be described based on the accompanying drawings.

(Basic Structure)

Figure 1:
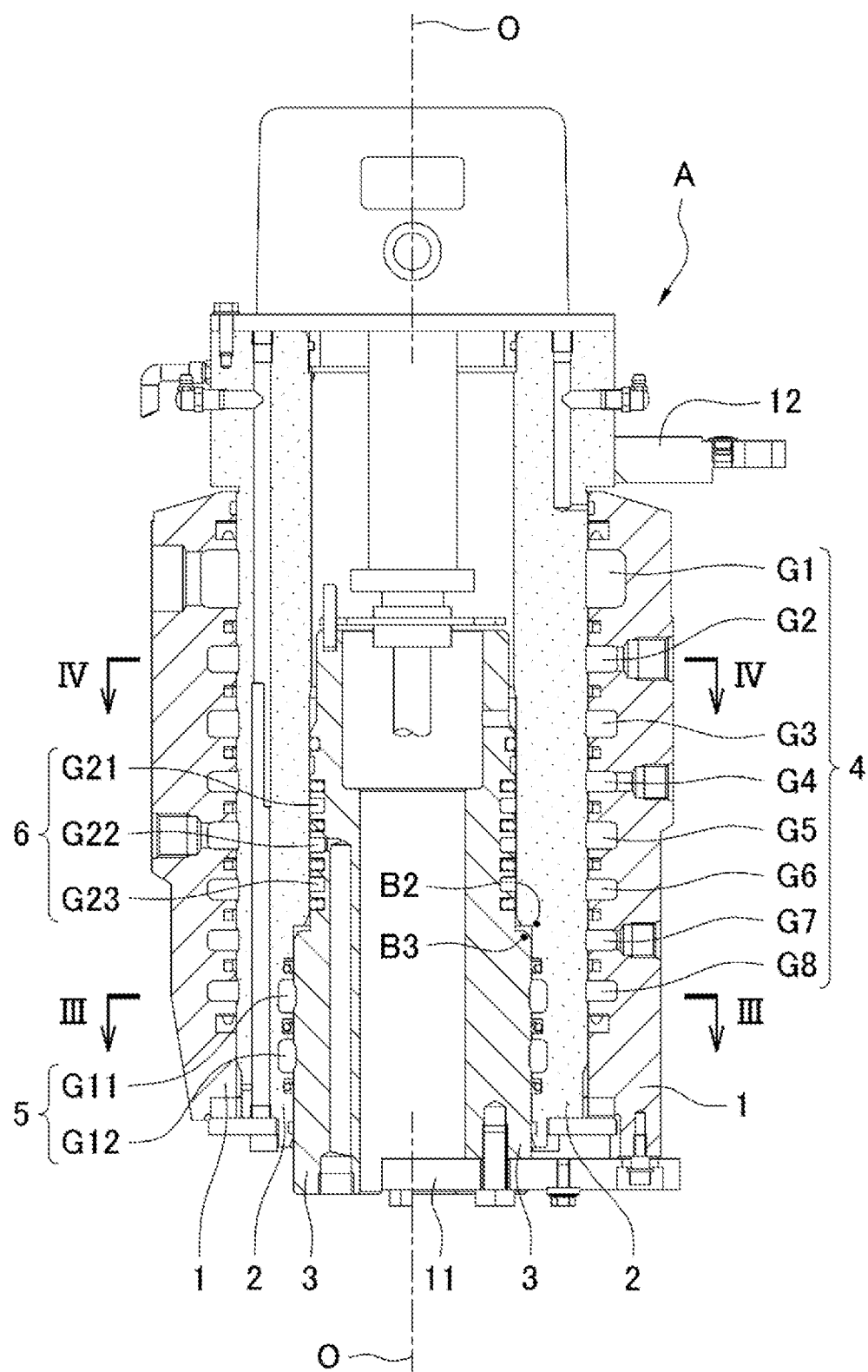
FIG. 1 is a vertical sectional view of a swivel joint according to an embodiment of the present invention.

First, the basic structure of a swivel joint A will be described based on FIG. 1.

The basic members constituting swivel joint A include outer cylinder 1, intermediate cylinder 2, and inner cylinder 3. They are fitted concentrically around center axis O extending vertically. Inner cylinder 3 is located on the innermost side, and outer cylinder 1 is located on the outermost side, and intermediate cylinder 2 is located between inner cylinder 3 and outer cylinder 1. Center axis O agrees with the slewing center of the slewing base not illustrated.

Intermediate cylinder 2 has a longest vertical length. Outer cylinder 1 has a length about ⅘ to ¾ of that of intermediate cylinder 2, and the length of inner cylinder 3 is about ½ of that of the intermediate cylinder.

In the present invention, it is preferable that inner cylinder 3 has a shorter vertical dimension as much as possible because the replacement cost is reduced. However, embodiments of various dimensions are adoptable, without limiting to the aforementioned dimension.

The lower ends of outer cylinder 1, intermediate cylinder 2, and inner cylinder 3 are aligned at almost the same height. The bottom end of outer cylinder 1 and the bottom end of inner cylinder 3 are linked by link member 11, and outer cylinder 1 and inner cylinder 3 are linked unturnably with use of a whirl-stop (not illustrated) relative to the traveling body. Therefore, outer cylinder 1 and inner cylinder 3 do not turn.

An upper end portion of intermediate cylinder 2 is mounted on the slewing base, not illustrated, via mounting plate 12. Accordingly, when the slewing base slews, intermediate cylinder 2 slidingly turns relative to outer cylinder 1 and inner cylinder 3.

Figure 5:
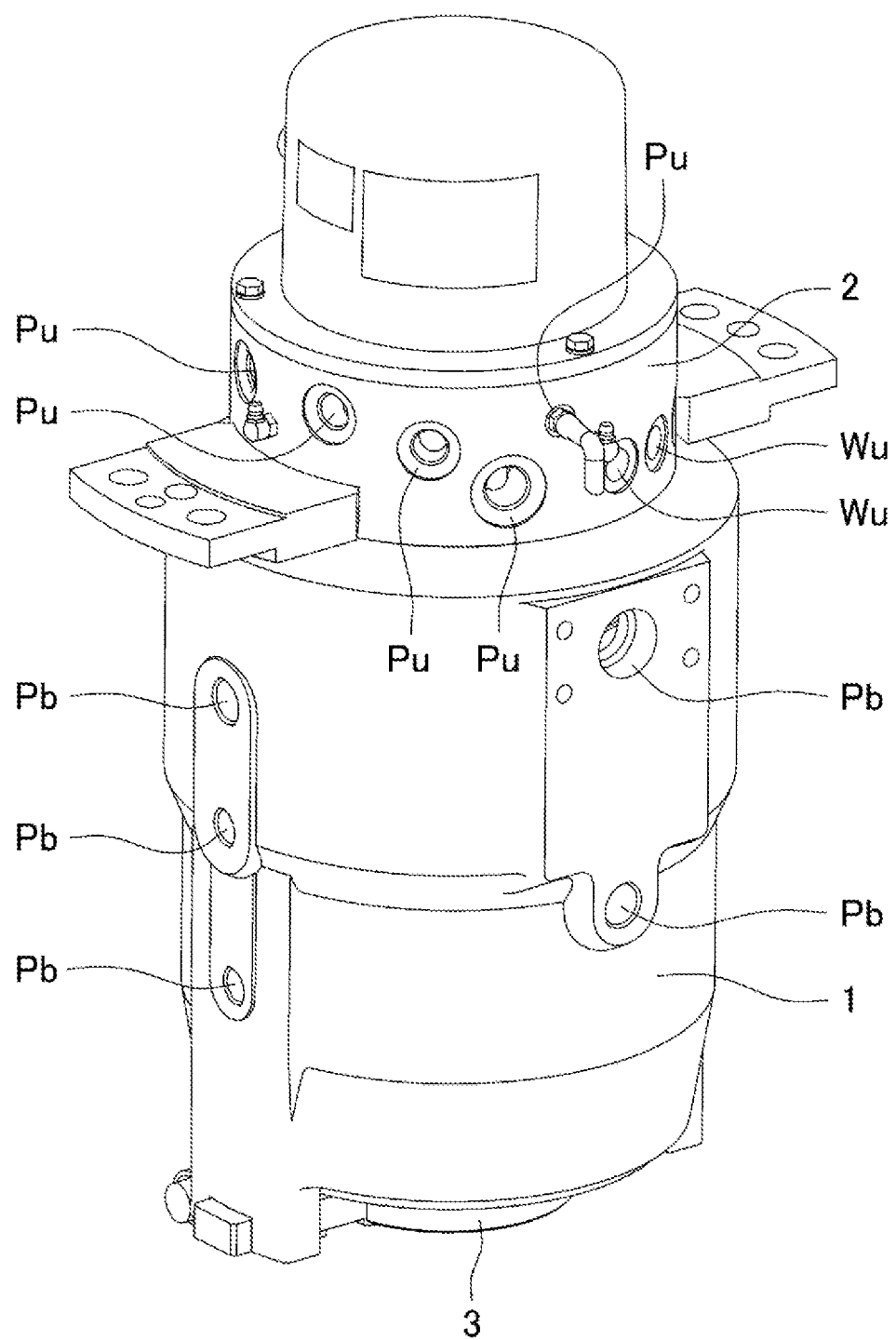
FIG. 5 is a perspective view of the front side of the swivel joint of FIG. 1.
Figure 6:
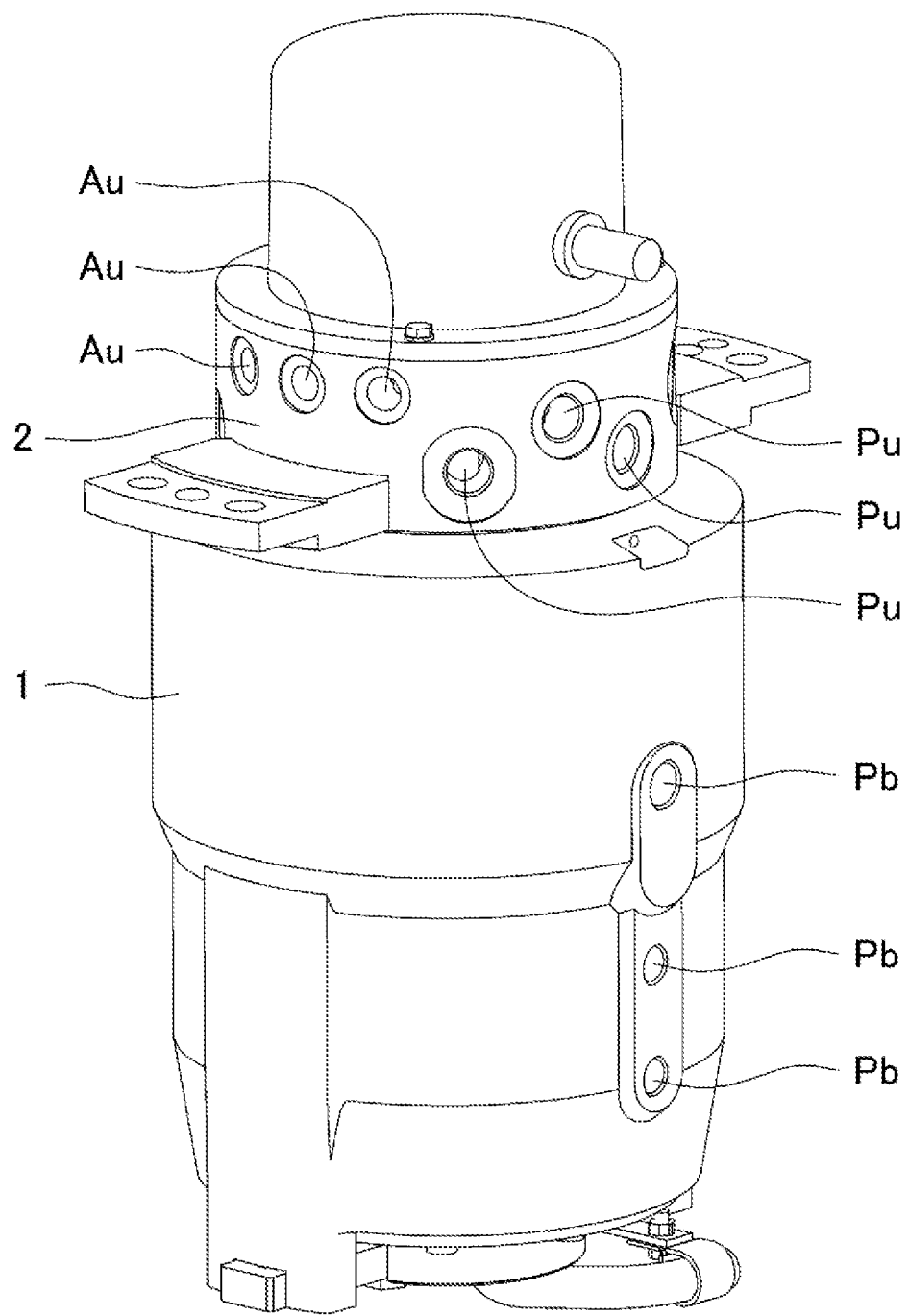
FIG. 6 is a perspective view of the rear side of the swivel joint of FIG. 1.
Figure 7:
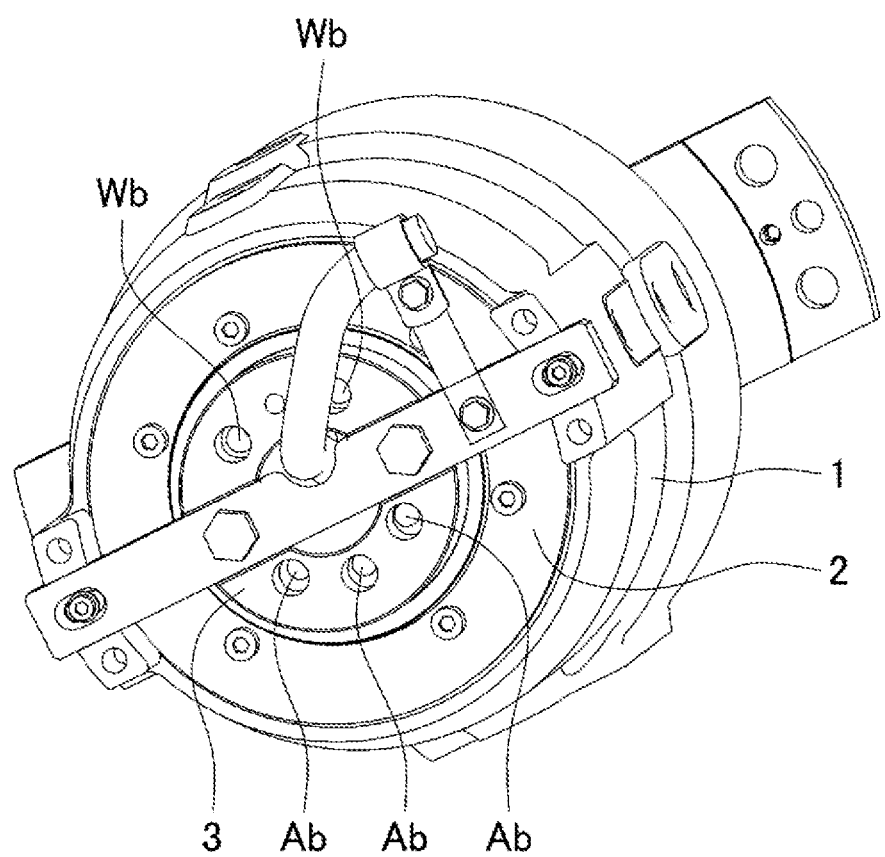
FIG. 7 is a perspective view of the bottom face of the swivel joint of FIG. 1.
Figure 8:
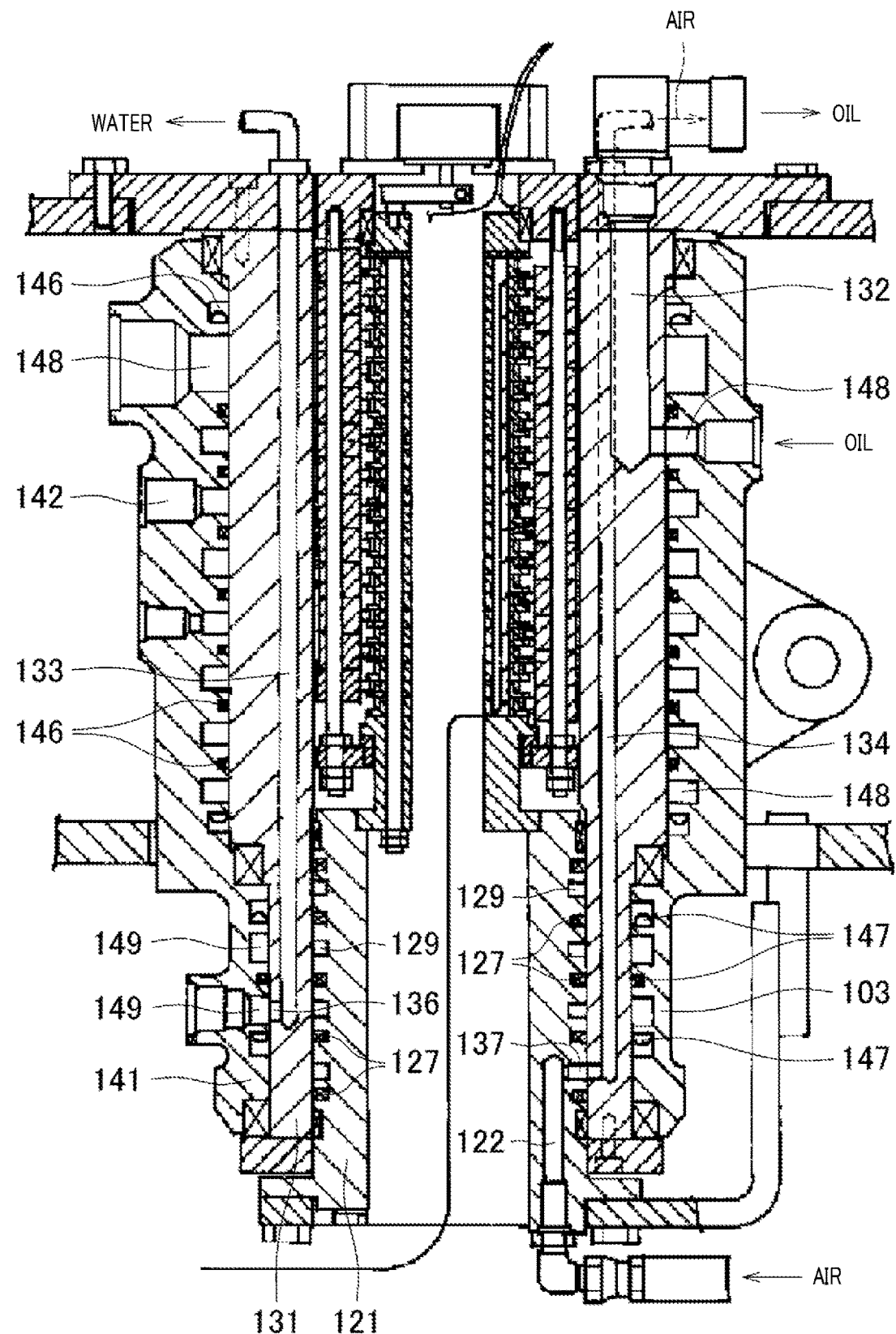
FIG. 8 is a vertical section view of a swivel joint of conventional art.

As illustrated in FIGS. 5 to 7, the swivel joint has supply/discharge paths for hydraulic oil, hot water, and the air, respectively.

(Hydraulic Oil Passage)

A side wall of outer cylinder 1 has lower pipe connection holes $P_b$ at eight places, and a side wall in an upper end portion of intermediate cylinder 2 has upper pipe connection holes $P_u$ at eight places.

Figure 4:
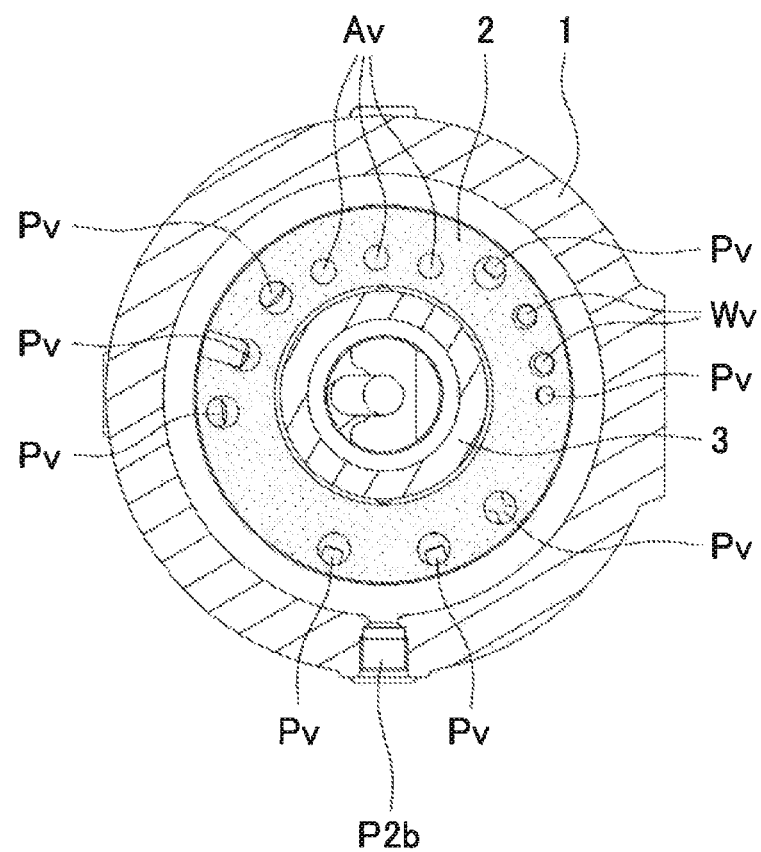
FIG. 4 is a horizontal sectional view taken along a line IV-IV in FIG. 1.

Lower pipe connection holes $P_b$ and upper pipe connection holes $P_u$ individually communicate with each other by eight vertical holes $P_v$ perforated in intermediate cylinder 2 illustrated in FIG. 4.

The oil path formed of lower pipe connection hole $P_b$, upper pipe connection hole $P_u$, and vertical hole $P_v$ constitutes a basic constitutional section of hydraulic oil passage 4.

It should be noted that a sliding passage portion formed on the inner circumferential face of outer cylinder 1 will be described below.

(Hot Water Passage)

As illustrated in FIGS. 5 to 7, the bottom end of inner cylinder 3 has lower pipe connection holes $W_b$ for hot water at two places. Further, a side wall in the upper end portion of intermediate cylinder 2 has upper pipe connection holes $W_u$ at two places.

Figure 3:
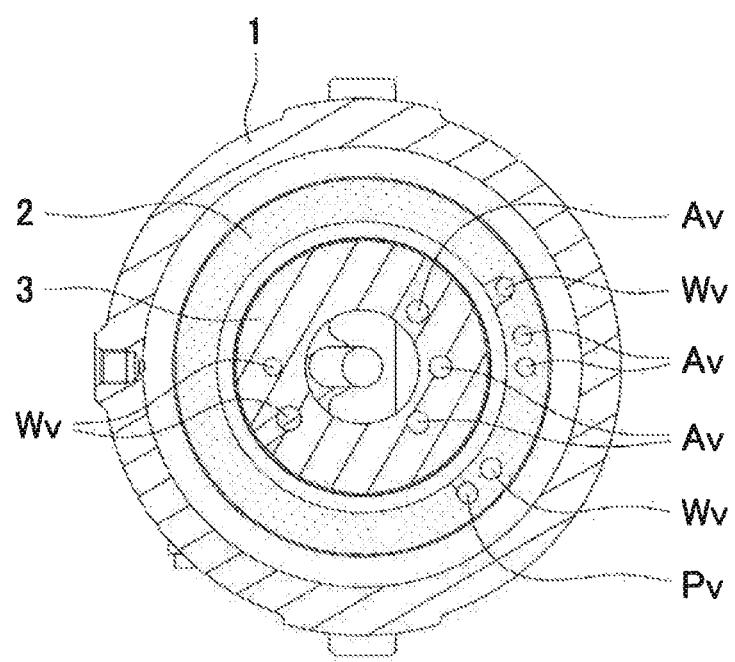
FIG. 3 is a horizontal sectional view taken along a line III-III in FIG. 1.

Lower pipe connection holes $W_b$ and upper pipe connection holes $W_u$ individually communicate with each other by vertical holes $W_v$ formed in intermediate cylinder 2 and inner cylinder 3 illustrated in FIGS. 3 and 4.

The passage formed of lower pipe connection hole $W_b$, upper pipe connection hole $W_u$, and vertical hole $W_v$ constitutes the basic constitutional section of hot water passage 5.

It should be noted that a sliding passage portion formed on the inner circumferential face of intermediate cylinder 2 will be described below.

(Additional Different Fluid Passage)

In the present embodiment, additional different fluid passage is allocated as air passage 6.

As illustrated in FIGS. 5 to 7, the bottom end of inner cylinder 3 has lower pipe connection holes $A_b$ for the air at three places. Further, on a side wall in the upper end portion of intermediate cylinder 2, upper pipe connection holes $A_u$ are formed at three places.

Lower pipe connection holes $A_b$ and upper pipe connection holes $A_u$ individually communicate with each other by vertical holes $A_v$ formed in intermediate cylinder 2 and inner cylinder 3 illustrated in FIGS. 3 and 4.

The passage formed of lower pipe connection hole $A_b$, upper pipe connection hole $A_u$, and vertical holes $A_v$ constitutes the basic constitutional section of air passage 6.

It should be noted that a sliding passage portion formed on the outer circumferential face of inner cylinder 3 will be described below.

Based on the aforementioned basic structure, in swivel joint A of the present embodiment, the hydraulic oil, the hot water, and the air transmitted from the respective supply sources on the traveling body to lower pipe connection holes $P_b$, $W_b$, and $A_b$ are taken out from upper pipe connection holes $P_u$, $W_u$, and $A_u$, and are supplied or discharged to a hydraulic device, a heating device, and a pneumatic device on the slewing base.

(Characteristic Parts)

Figure 2:
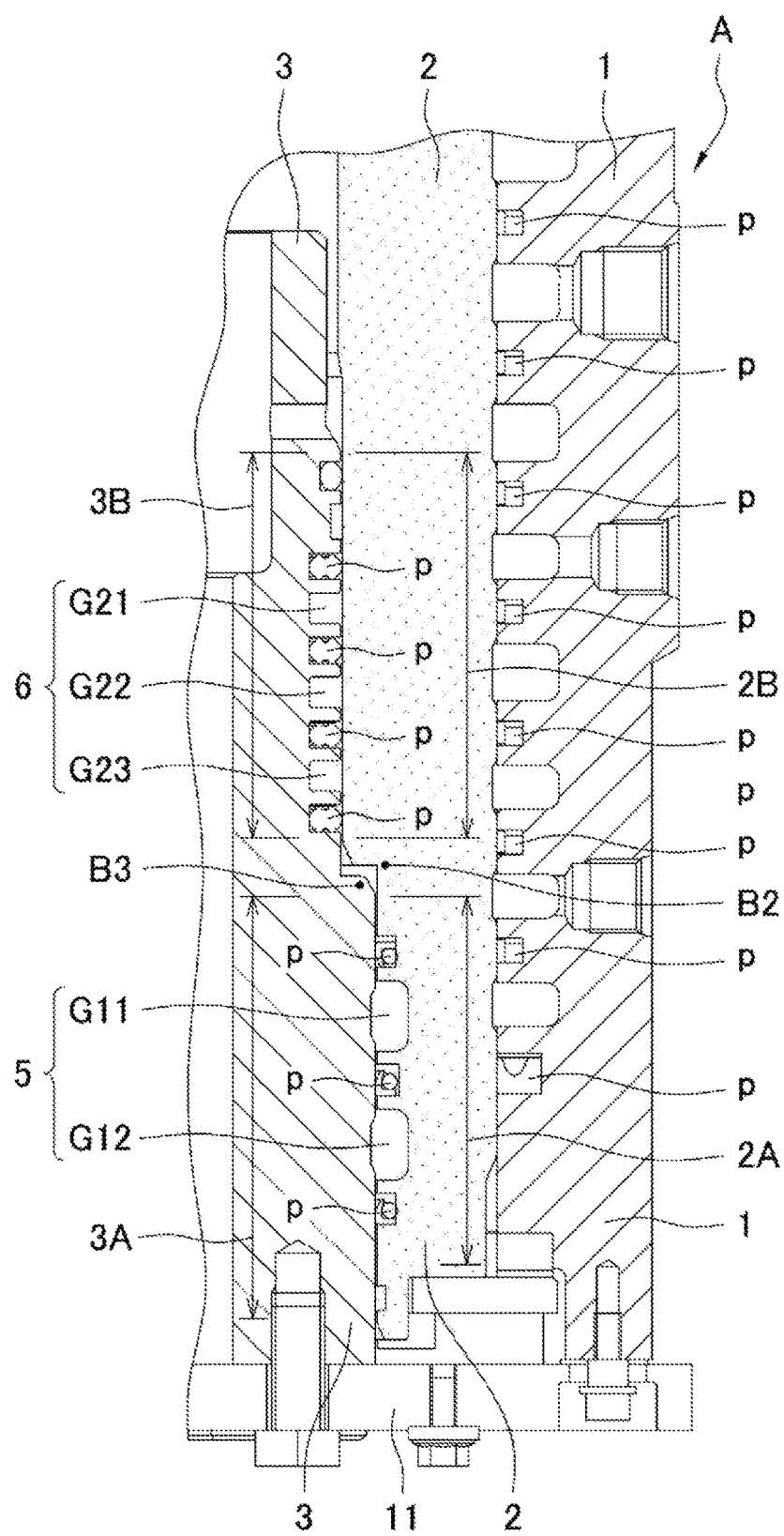
FIG. 2 is an enlarged view of a main part of the swivel joint of FIG. 1.

Next, characteristic parts of the present invention will be described based on FIGS. 1 and 2.

The entire vertical area on the inner circumferential face of outer cylinder 1 and the entire vertical area on the outer surface of intermediate cylinder 2 have an equal diameter structure with no level difference.

Meanwhile, the inner circumferential face of intermediate cylinder 2 and the outer surface of inner cylinder 3 have a different diameter structure in which there is a level difference in the middle of the vertical direction and the upper side and the lower side thereof have different diameters.

Level difference $B_3$ of inner cylinder 3 is formed at a position of about ½ in the vertical dimension of inner cylinder 3. In the portion below level difference $B_3$, the outer diameter of inner cylinder 3 is larger. The portion below level difference $B_3$ is referred to as inner cylinder large diameter portion 3A, and the portion above it is referred to as inner cylinder small diameter portion 3B.

Level difference $B_2$ of intermediate cylinder 2 is formed at a position corresponding to level difference $B_3$ of inner cylinder 3. The portion below level difference $B_2$ is referred to as intermediate cylinder large diameter portion 2A, and the portion above it is referred to as intermediate cylinder small diameter portion 2B. It should be noted that "large diameter" and "small diameter" are named on the basis of the radius from center axis O. Accordingly, in intermediate cylinder 2, a thin portion forms intermediate cylinder large diameter portion 2A, and a thick portion forms intermediate cylinder small diameter portion 2B.

(Sliding Passage Portion of Hydraulic Oil Passage)

A sliding passage portion of the hydraulic oil passage is provided between the entire vertical area on the inner circumferential face of outer cylinder 1 and the entire vertical area on the outer circumference face of intermediate cylinder 2.

The outer circumferential face of intermediate cylinder 2 is basically flat, and even if a recessed portion is formed, it is very shallow.

On the other hand, the inner circumferential face of outer cylinder 1 has a plurality of annular grooves. The annular groove is called an inner annular groove because it is provided on the inner circumferential face, and is formed along the entire periphery of the inner circumferential face of outer cylinder 1 literally.

In the illustrated embodiment, eight inner annular grooves G1 to G8 are formed. Respective inner annular grooves G1 to G8 are formed with intervals vertically.

Respective inner annular grooves G1 to G8 individually communicate with lower pipe connection holes $P_b$. They also communicate with vertical holes $P_v$ in intermediate cylinder 2. Accordingly, even if intermediate cylinder 2 turns, it is possible to supply and discharge hydraulic oil between lower pipe connection holes $P_b$ and upper pipe connection holes $P_u$.

Further, annular packing grooves are formed between respective level inner annular grooves G1 to G8 and on the upper and lower outer sides thereof, and annular packing p is inserted therein. With such a sealing structure, it is possible to prevent leakage of liquid between respective level inner annular grooves G1 to G8.

While eight inner annular grooves G1 to G8 are provided in the present embodiment, a configuration having seven or less annular grooves or nine or more annular grooves may be included in the present invention.

the inner annular grooves G1 to G8 are formed by inner surface processing performed on outer cylinder 1 made be casting. As outer cylinder 1 is a member having a large diameter and there is no portion with a small diameter, inner surface processing is not difficult. Accordingly, productivity is not lowered, and high processing accuracy can be maintained.

(Sliding Passage Portion of Hot Water Passage)

A sliding passage portion of the hot water passage is formed between inner cylinder large diameter portion 3A that is a lower portion of inner cylinder 3 and intermediate cylinder large diameter portion 2A that is a lower portion of intermediate cylinder 2.

The outer circumferential face of inner cylinder large diameter portion 3A is basically flat, and even if a recessed portion is formed, it is very shallow.

On the other hand, inner circumferential face of intermediate cylinder large diameter portion 2A has a plurality of inner annular grooves G1 and G12. Further, annular packing grooves are formed on the upper and lower outer sides of two annular grooves G11 and G12 and between them, and annular packing p is inserted therein.

While two inner annular grooves G11 and G12 are provided in the present embodiment, the number of the inner annular grooves may be one or three or more. The hot water system can be supplied or discharged according to the number of the provided inner annular grooves.

Respective inner annular grooves G11 and G12 individually communicate with lower pipe connection holes $W_b$ formed in inner cylinder 3, and also individually communicate with vertical holes $W_v$ formed in intermediate cylinder 2. Accordingly, even when intermediate cylinder 2 turns, hot water can be supplied and discharged between lower pipe connection holes $W_b$ and upper pipe connection holes $W_u$.

(Sliding Passage Portion of Air Passage)

A Sliding passage portion of the air passage is formed between inner cylinder small diameter portion 3B that is an upper portion of inner cylinder 3, and intermediate cylinder small diameter portion 2B that is an intermediate portion of intermediate cylinder 2.

The inner circumferential face of intermediate cylinder small diameter portion 2B is basically flat, and even if a recessed portion is formed, it is very shallow.

On the other hand, the outer circumferential face of inner cylinder small diameter portion 3B has a plurality of outer annular grooves G21, G22, and G23. Further, annular packing grooves are formed between three annular grooves G21, G22, and G23 and the upper and lower outer sides thereof, and annular packing p is inserted therein.

While three inner annular grooves G21, G22, and G23 are provided in the present embodiment, the number of the annular grooves may be two or less or four or more. Supply and discharge of the air systems corresponding to the number of provided inner annular grooves can be achieved.

Respective inner annular grooves G21, G22, and G23 individually communicate with lower pipe connection holes $A_b$ formed in inner cylinder 3, and also individually communicate with vertical holes $A_v$ in intermediate cylinder 2. Accordingly, even when intermediate cylinder 2 turns, it is possible to supply and discharge the air between lower pipe connection holes $A_b$ and upper pipe connection holes $A_u$.

Swivel joint A of the present embodiment configured as described above has the advantages provided below.

(1) As the lubricating property of hot water is low, a counter sliding surface of packing p adjacent to inner annular grooves G11 and G12 of hot water passage 5, that is, the outer circumferential face of inner cylinder 3, is easily worn. However, in the case of replacement due to wear, it is only necessary to replace inner cylinder 3 that is a smallest member. Therefore, the replacement cost is suppressed.

(2) Outer annular grooves G21 to G23 of air passage 6 are formed on the outer circumferential face of inner cylinder 3. Therefore, processing is performed easily.

(3) Inner cylinder 3 and intermediate cylinder 2 have level differences B2 and B3 in the middle of the vertical direction. Therefore, when assembling inner cylinder 3 into intermediate cylinder 2, assembly can be made without causing the inner face of packing p of hot water passage 5 to be in contact with the outer face of packing p of air passage 6. Therefore, the insertion work can be performed easily, and an inconvenience such as deformation of packing is less likely to be caused.

Other Embodiments

While air flow 6 is assigned to additional different fluid passage in the aforementioned embodiment, a passage for supplying and discharging any type of fluid may be assigned. There is no limitation on the fluid to be supplied and discharged. For example, it may also be used as a supply/discharge passage of fuel oil.

REFERENCE SIGNS LIST

A Swivel joint
G Inner annular groove
O Center axis
p Annular packing
1 Outer cylinder
2 Intermediate cylinder
3 Inner cylinder
4 Hydraulic oil passage
5 Hot water passage
6 Additional different fluid passage

The invention claimed is:

1. A swivel joint for supplying and discharging a plurality of types of fluid above and below a slewing base, the swivel joint comprising:
an outer cylinder, an intermediate cylinder, and an inner cylinder that are arranged concentrically around a center axis extending vertically, wherein
the outer cylinder and the inner cylinder are unturnably fixed, and the intermediate cylinder is turnable relative to the outer cylinder and the inner cylinder,
a hydraulic oil passage is provided between the outer cylinder and the intermediate cylinder, the hydraulic oil passage including an inner annular groove formed on an inner circumferential face of the outer cylinder,
a hot water passage is provided between a lower portion of the inner cylinder and the intermediate cylinder, the hot water passage including an inner annular groove formed on an inner circumferential face of the intermediate cylinder, and
an additional different fluid passage is provided between an upper portion of the inner cylinder and the intermediate cylinder, the additional different fluid passage including an outer annular groove formed on an outer surface of the inner cylinder.

2. The swivel joint according to claim 1, wherein
the inner cylinder has a stepped portion formed on an outer circumferential face at a middle position in a vertical direction of the inner cylinder,
the intermediate cylinder has a stepped portion formed on the inner circumferential face at a middle position in a vertical direction of the intermediate cylinder,
the inner annular groove constituting the hot water passage and an annular packing are provided on an inner circumferential face of an intermediate cylinder large diameter portion below the stepped portion in the intermediate cylinder facing an inner cylinder large diameter portion below the stepped portion in the inner cylinder, and
the outer annular groove constituting the additional different fluid passage and an annular packing are provided on an outer circumferential face of an inner cylinder small diameter portion above the stepped portion in the inner cylinder facing an intermediate cylinder small diameter portion above the stepped portion in the intermediate cylinder.

3. The swivel joint according to claim 1, wherein
a plurality of the inner annular grooves of the hot water passage and a plurality of the outer annular grooves for the additional different fluid are formed.

* * * * *